(12) United States Patent
Wherley

(10) Patent No.: US 7,080,708 B2
(45) Date of Patent: Jul. 25, 2006

(54) SKID LOADER DOOR PROTECTION APPARATUS AND METHOD

(75) Inventor: Steven J. Wherley, Carver, MN (US)

(73) Assignee: Steven J Wherley, Carver, MN (US)

( * ) Notice: Subject to any disclaimer, the term of this patent is extended or adjusted under 35 U.S.C. 154(b) by 90 days.

(21) Appl. No.: 10/338,177

(22) Filed: Jan. 7, 2003

(65) Prior Publication Data
US 2004/0000799 A1    Jan. 1, 2004

Related U.S. Application Data

(60) Provisional application No. 60/346,697, filed on Jan. 7, 2002.

(51) Int. Cl.
*B60K 28/12* (2006.01)

(52) U.S. Cl. .................................... 180/286

(58) Field of Classification Search ........ 180/271–273, 180/286; 307/10.1, 326; 340/426.28
See application file for complete search history.

(56) References Cited

U.S. PATENT DOCUMENTS

| | | | | |
|---|---|---|---|---|
| 2,876,856 A | * | 3/1959 | Greene | 180/286 |
| 3,993,157 A | * | 11/1976 | Schulte | 180/286 |
| 4,655,634 A | * | 4/1987 | Loy et al. | 404/84.05 |
| 5,077,631 A | * | 12/1991 | Cleary | 361/192 |
| 5,664,637 A | * | 9/1997 | Ohta et al. | 180/286 |
| 6,560,495 B1 | * | 5/2003 | Furuta et al. | 700/79 |
| 6,712,171 B1 | * | 3/2004 | Farmer | 180/286 |
| 2003/0192732 A1 | * | 10/2003 | Warkentine | 180/286 |
| 2005/0035669 A1 | * | 2/2005 | Bares et al. | 307/326 |

* cited by examiner

*Primary Examiner*—Paul N. Dickson
*Assistant Examiner*—Laura B. Rosenberg
(74) *Attorney, Agent, or Firm*—Robert A Pajak

(57) ABSTRACT

An access door condition sensing system is provided for skid-steer equipment where a door open condition is intended to disable either or both travel or implement hydraulic lifting arms commonly used for lifting a loader bucket so as to diminish the potential for damage to an open door or injury to an operator or bystander opening the door.

5 Claims, 6 Drawing Sheets

SKID LOADER DOOR PROTECTION APPARATUS AND METHOD

RELATED APPLICATION

This application claims the benefit of priority pursuant to 35 USC 119 of provisional patent application Ser. No. 60/346,697 filed Jan. 7, 2002, the disclosure of which application is hereby incorporated in its entirety by reference herein.

FIELD OF THE INVENTION

This invention generally relates to skid-steer machines with loaders, also commonly referred to as skid-steers or skid loaders. More specifically, the present invention directed to a protection scheme for preventing damage to a cab door associated with a skid-steer loader, and preventing injury to an operator or bystander.

BACKGROUND OF THE INVENTION

The present invention generally relates to skid-steers loaders commonly found and employed in the construction industry, and that have a cabin which is accessed through an opening having a protection or safety door. Such skid-steer loaders are also sometimes commonly referred to as skid-steers or skid loaders. These machines have a variety of uses in agriculture, landscaping, and construction and are produced by industrial equipment companies such as Bobcat, Caterpillar, Case, Clark, Ingersol-Rand, New Holland, among others.

Commonly, a skid-steer loader is a machine that consists of a base on four wheels, with a forward cabin enclosure for the operator. The operator, when seated in the cabin, operates a pair of independent travel controls for permitting essentially zero radius turning by independently controlling motion of left and right wheels or tractor belts—the skid-steer.

Commonly, a loader assembly is pivotally attached to skid-steer. The loader assembly commonly comprises a pair of hydraulically controlled lift arms that are pivotally coupled to the frame of the skid-steer at one end, and are intended to move in unison about a defined base pivot axis generally rearward of the cabin. A hydraulically controlled tiltable bucket, or other implement, is commonly pivotally attached and between the other end of the pair of lift arms.

The arrangement of the loader is such that the lift arms are capable of moving in planes parallel to the sides of the machine, and pivot around the base pivot axis to the rear of the machine. These lift arms are intended to move in unison about this base pivot axis so as to raise and lower the attached bucket or other device that is attached to the ends of the lift arms in front of the operator's cabin.

Within the cabin are independent controls for independently controlling the hydraulically controlled tiltable bucket about an implement pivot axis at the end of the lift arms, and hydraulically controlling the lifting movement of the pair of lift arms by movement about the base pivot axis.

One of the inherent risks of the current commonly accepted design of the skid-steer is related to the lifting mechanism of the loader assembly—namely the pair of lifting arms as described above. Some models of this machine include a cabin with an access door through which the operator must enter and exit the skid-steer cabin. Although the arrangement of the lift arms and associated cross members may take on many forms, the arms or cross members may transversely pass through a portal through which an operator may pass through to access the cabin. The presence of the door, either front mounted or side mounted, in conjunction with unwanted movement of the lifting arms presents a potential risk for damage to this door and/or the safety of the operator entering or exiting the skid-steer cabin.

The risk for damage to the skid-steer cabin is that if the cabin door is open and the lift arms of the skid-steer are raised or lowered, these arms could potentially damage or destroy the cabin door. An additional safety hazard present is that if this door is open and the operator is attempting to enter or exit, serious injury or death may result if the arms unexpectedly move across the door opening. Similarly, a bystander may attempt to open the cabin door unaware of the hazard of movement of the lifting arms thereby potentially placing the bystander in harms way.

SUMMARY OF THE INVENTION

The object of the present invention is to provide a mechanism to assist in avoiding the potential damage to the skid-steer cabin door or mitigating the safety hazard to an operator or bystander.

Another object of the present invention is mitigating the problem of loader lift arms catching on an open cabin door which may result in breaking an access door window, or ripping the access door from the frame of the skid steer.

In accordance with the present invention, a door sensing switch is provided for sensing the position a skid-steer access door, open or closed, latched or unlatched. The sensing switch is arranged to disable the machine's hydraulic control system functions, i.e., lift and tilt hydraulic functions.

In accordance with one aspect of the present invention, a door protection scheme is adaptable with other operator safety switches.

In one embodiment of the present invention, the a door protection system and method is provide by way of a field adaptable safety protection system for modifying existing skid-steer loader machines.

DETAILED DESCRIPTION OF THE INVENTION

Figure 1:
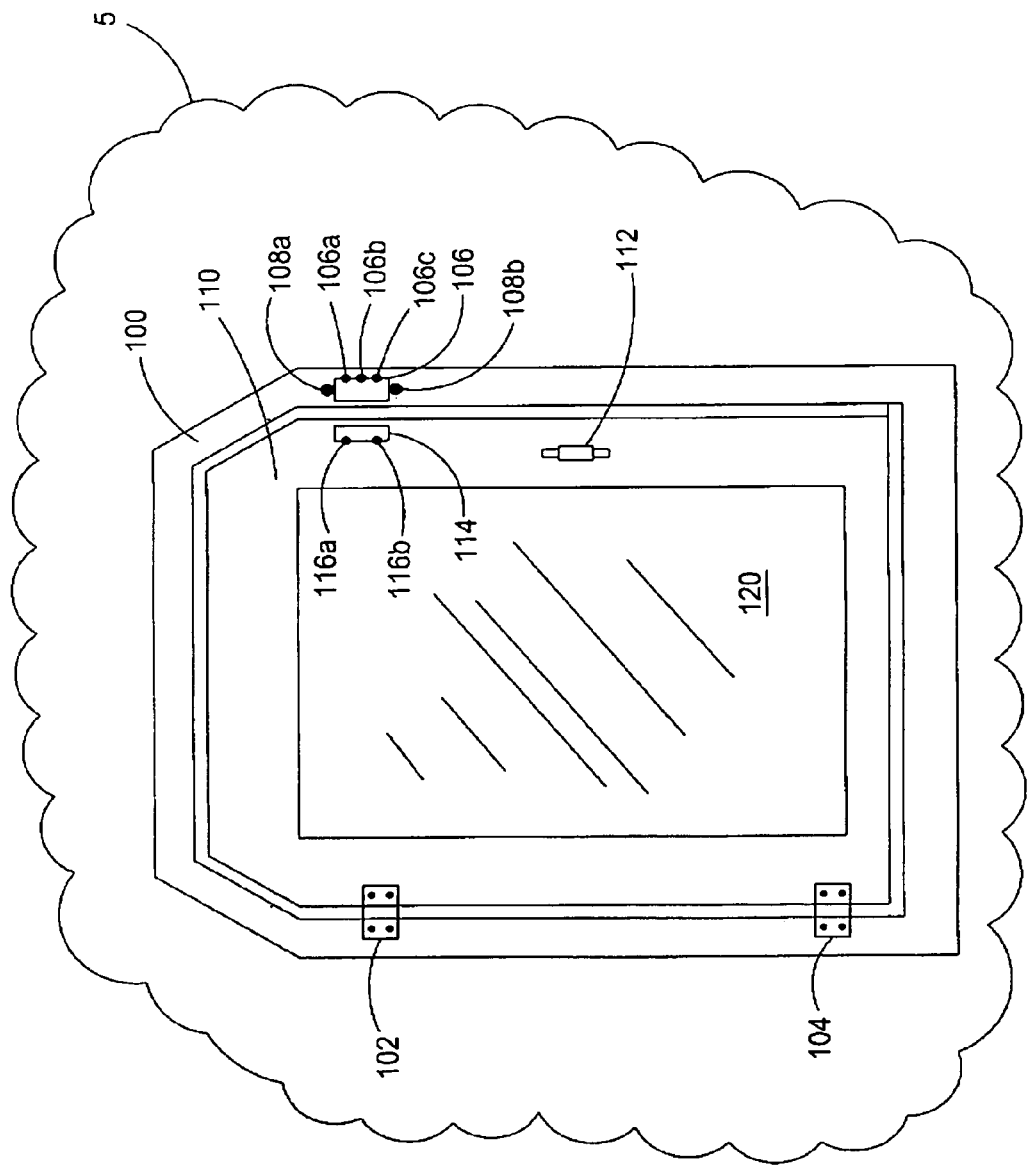
FIG. 1 illustrates a partial side view of a skid-steer and apparatus in accordance with the present invention.

Illustrated in FIG. 1 is a partial plan view of a skid-steer access door that forms, in part, a skid-steer cabin. This view is limited to the skid-steer cabin door area from the latch side of the door. In this figure, the enclosed area 5 refers generally to the skid-steer cabin area surrounding a door frame 100—either front or side mounted to the skid steer body (not shown). A cabin door 110 is hingably coupled to door frame 100 by way of a pair of hinges, 102 and 104. Cabin door 110 is shown as including a window 120. Cabin door 110 includes an access handle 112. The door arrangement as just described is commonly known in the art of skid-steers having such doors, and are more commonly at the front the machine—loader-bucket or implement side.

In accordance with the present invention, an access door condition, open or closed, latched or un-latched, sensing system in the form of a magnetically operated switch assembly is further illustrated in FIG. 1. There shown is a magnetically operated switch assembly including a magnet 114 which is affixed to the cabin door 110, for example by way of a pair screws 116a and 116b. A magnetically operated switch 106 is affixed to door frame 100, for example by way of a pair screws 108a and 108b. By way of example, magnetic switch is illustrated as a single pole, double throw switch having three conductor terminating terminals 106a, 106b and 106c. However, a single pole single throw switch may be adequate depending upon the particular skid steer manufacturers machine control system, safety mechanizations, and machine controller—mechanical or electrical.

Figure 2:
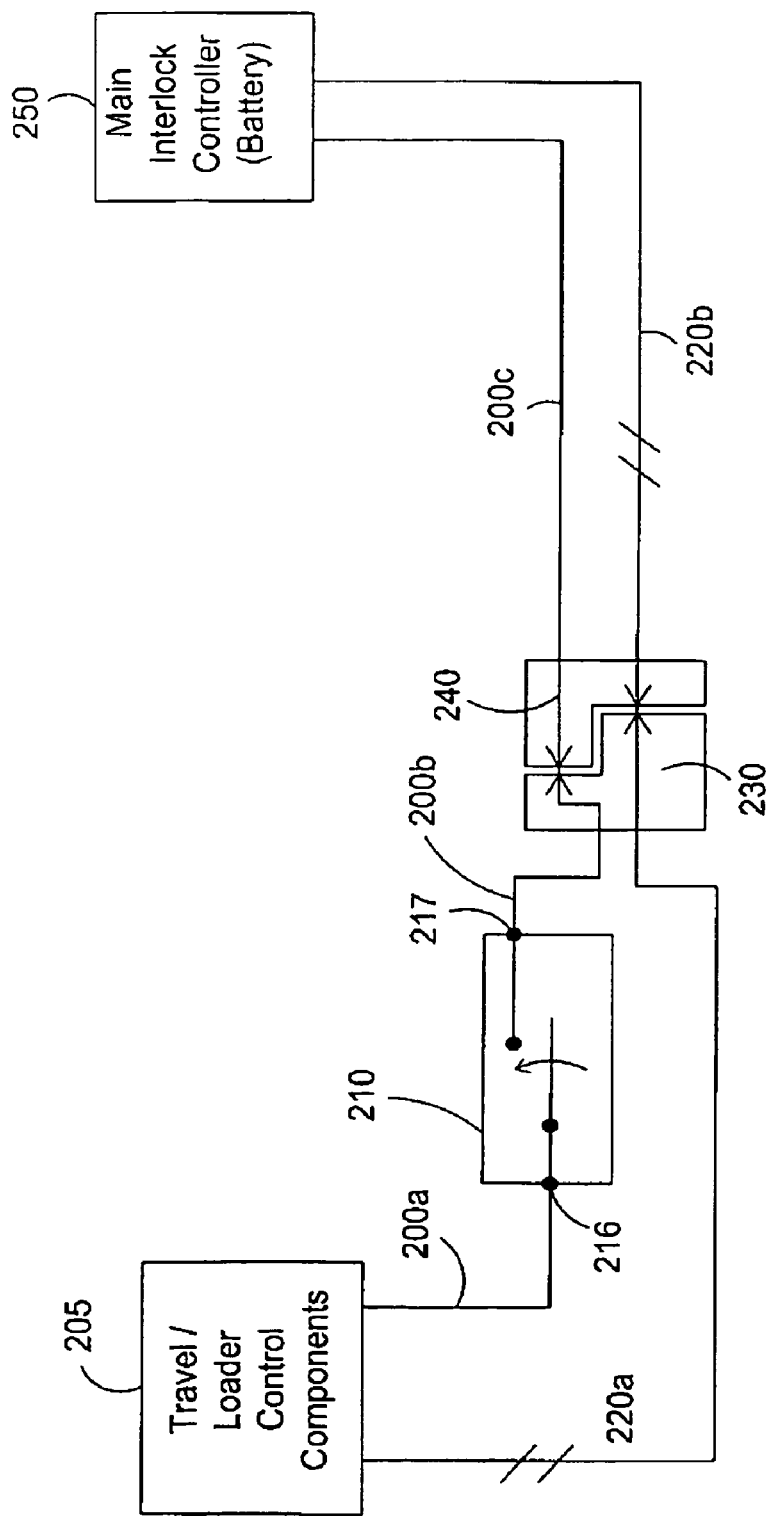
FIG. 2 is a partial schematic wiring illustrating a safety circuit commonly employed in prior art skid-steers.

FIG. 2 illustrates a wiring diagram and operator safety circuit function in accordance with skid-steers known in the art. Before proceeding, it should be recognized that commonly skid-steers include a general safety circuit function as particularly illustrated in the exemplary wiring schematic diagram of FIG. 2. There shown are a group of conductors 220 passing from a travel/loader control components block 205 to a main interlock controller 250 through mating connector plugs 230 and 240. Further, a single conductor 200 passes from block 205 to main controller 250 successively through a operator safety switch function means in the form of a single pole single throw switch 210, and connector plugs 230 and 240.

It should be noted that blocks 205 and 250 are machine manufacturer specific and perform a variety of machine control tasks in order to enhance operator and bystander safety. However, common to such controllers and wiring therebetween are specific electrical conductors which may be electrically shorted or opened for disabling specific travel and hydraulic loader control functions as is well known in the art. Therefore, conductors 220 may be a single conductor or more as required on the various machines made in accordance with a specific manufacturer. However, it has been discovered that many of these machines commonly employ at least one mating connector assembly for routing a group of conductors, and the also the safety conductor line 200 associated with the operator safety switch means, which may be for example a main electrical power line or the like. Before proceeding, in the following exposition a closed switch condition generally indicates a safe condition, However, depending upon the electrical circuit chosen, alternatively, an open switch condition may indicate the safe condition.

Continuing with reference to FIG. 2, switch 210 may be for example a lap-bar-activated lockout switch that must be in a down position for closing switch 210 allowing full operation of the operator controls, travel and/or loader controls. Operator safety switch 210 may be for example a pressure activated seat switch requiring an operator to be seated before the operator controls are engaged, or the like, more specifically disabling the travel/loader control components. As before, when the associated device is in the safe position switch 210 contacts are in the switch closed position that in turn enables the operation of the skid-steer controls 250.

Figure 3:
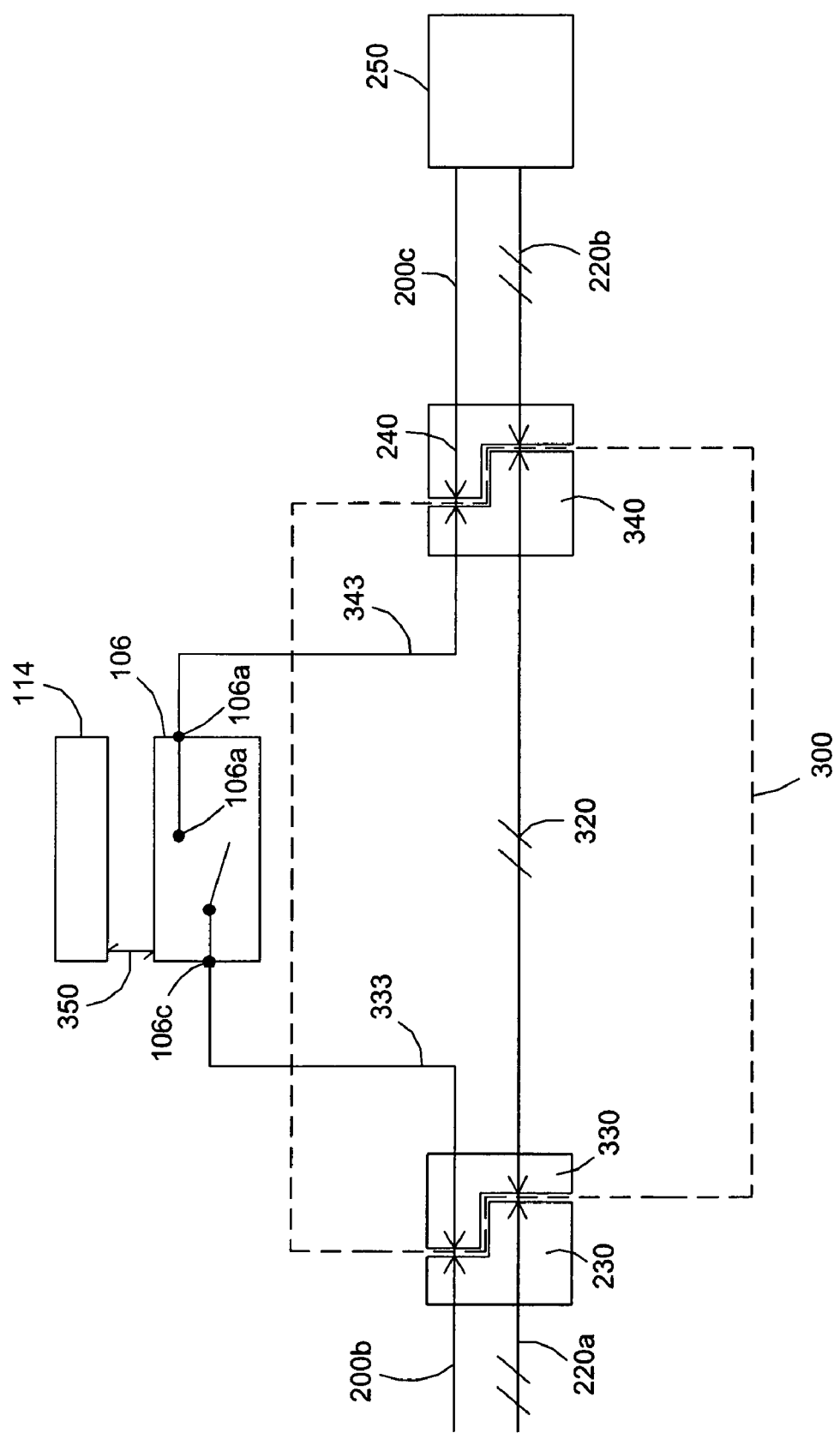
FIG. 3 is a partial schematic wiring illustrating door protection safety circuit in accordance with the present invention.

FIG. 3 illustrates a wiring diagram of a door protection safety system in accordance with the present invention. In FIG. 3, similar serving components as those in FIG. 2 have retained the same numeral designation. In accordance with the present invention, a wiring harness generally indicated by numeral 300 comprises mating connector plugs 330 and 340, similar to mating plug 240 and mating connector plug 230 respectively. A group of conductors 320 passes from connector plug 330 to connector plug 340. A single conductor 333 exits from conductor 330, and a single conductor 343 exits from connector plug 340.

As illustrated in FIG. 3, the magnetic switch assembly including magnet 114 and switch 106 are arranged such that if the door is open and the distance separating switch 106 from magnet 114 is sufficiently greater than a distance indicted by numeral 350, then the switch 106 will be in the opened condition. Terminal 106c is electrically connected to the terminating end of conductor 333, and the opened switch pole indicated by terminal end 106a is electrically connected to the terminating end of conductor 343.

With the arrangement as just described, if magnet 114 is sufficiently close to magnetically operated switch 106, conductor 333 will be connected to conductor 343. In contrast, if magnet 114 is sufficiently away from magnetically operated switch 106, conductor 333 will be electrically disconnected from conductor 343.

In the present invention, the combination of the wiring harness 300 and door switch sensing assembly (magnetically operated switch 106 and magnet 114), as described in FIG. 3, is intended to be inserted in between mating connector plugs 230 and 240. In accordance with the present invention as illustrated in FIG. 3, connector plug 330 is arranged to mate with connector plug 230, and connector plug 340 is arranged to mate with connector plug 240 so as to successively and correspondingly connect conductors 220a to conductors 220b through conductors 320, and successively connect conductor 200b to conductor 200c successively through conductor 333, switch 105. and conductor 343.

In one embodiment of the present invention, the combination of wiring harness 300 and door switch assembly may be field installed. That is, depending on the skid-steer manufacture, wiring harness 300 is provided with the proper mating connectors to mate with existing connectors. The magnetically operated switch assembly may be mounted to the door by way of a wide array of fastening techniques. For example, the completion of the installation of this apparatus into the skid-steer may be accomplished by attaching the magnetically operated switch 106 to the cabin door frame 100 by means of screws 108a and 108b and accommodating holes. The magnet may then be installed onto cabin door 110 by means of screws 116a and 116b and accommodating holes. Finally the wiring conductors 200 and 220 are routed appropriately through the skid-steer cabin.

Alternatively, mounting of magnet 114 and switch 106 may be accomplished by other techniques, including among others applying a double sided tape to the backs of switch 106 and magnet 114 and appropriately securing them to the frame and door respectively.

Employment of the present invention provides a mechanism to assist in avoiding the potential damage to the skid-steer door or injury to the operator by way of disabling the loader control functions, i.e., hydraulically tilting and/or lifting loader functions—more specifically the hydraulically controlled lift arms. In accordance with the pre invention, the above function may be performed through the use of a means to detect an open cabin door 110 and a means for the detection of this state to disable the operation of the skid-steer if the cabin door is detected as being in the open position (FIG. 3).

In the exemplary embodiment of the invention illustrated herein, the means to detect an open cabin door is through the use of magnetically operated switch 106. Referring to FIG. 1, switch 106, and the associated and separate magnet 114, are arranged to operate the switch as described above. Of course, switch 106 and magnet 114 must be arranged and mounted in such a manner so as to provide the intended function. That is, (i) when the door is closed, switch 106 is closed enabling the skid-steer control functions and other safety functions (switch 210), and (ii) when the door is partially open or greater, switch 106 is open thereby disabling the skid-steer control functions, and more importantly, the operation, and particularly any movement of the loader lift arms.

In accordance with one aspect of the present invention, the circuit arrangement, and particularly wire harness 300 generally described in FIG. 3 is a unique arrangement that may be inserted in series into the circuit in FIG. 2 so as to enable or disable the operation of the skid-steer controls in the same manner. The unique apparatus of the present invention as illustrated in FIG. 3 may be tailored to the particular design of various current models of skid-steers. This may enable the connections necessary to perform insertion of the wire harness 300 as more particularly described with reference to FIG. 3 easily and without damage to the normal wiring present.

Figure 4:
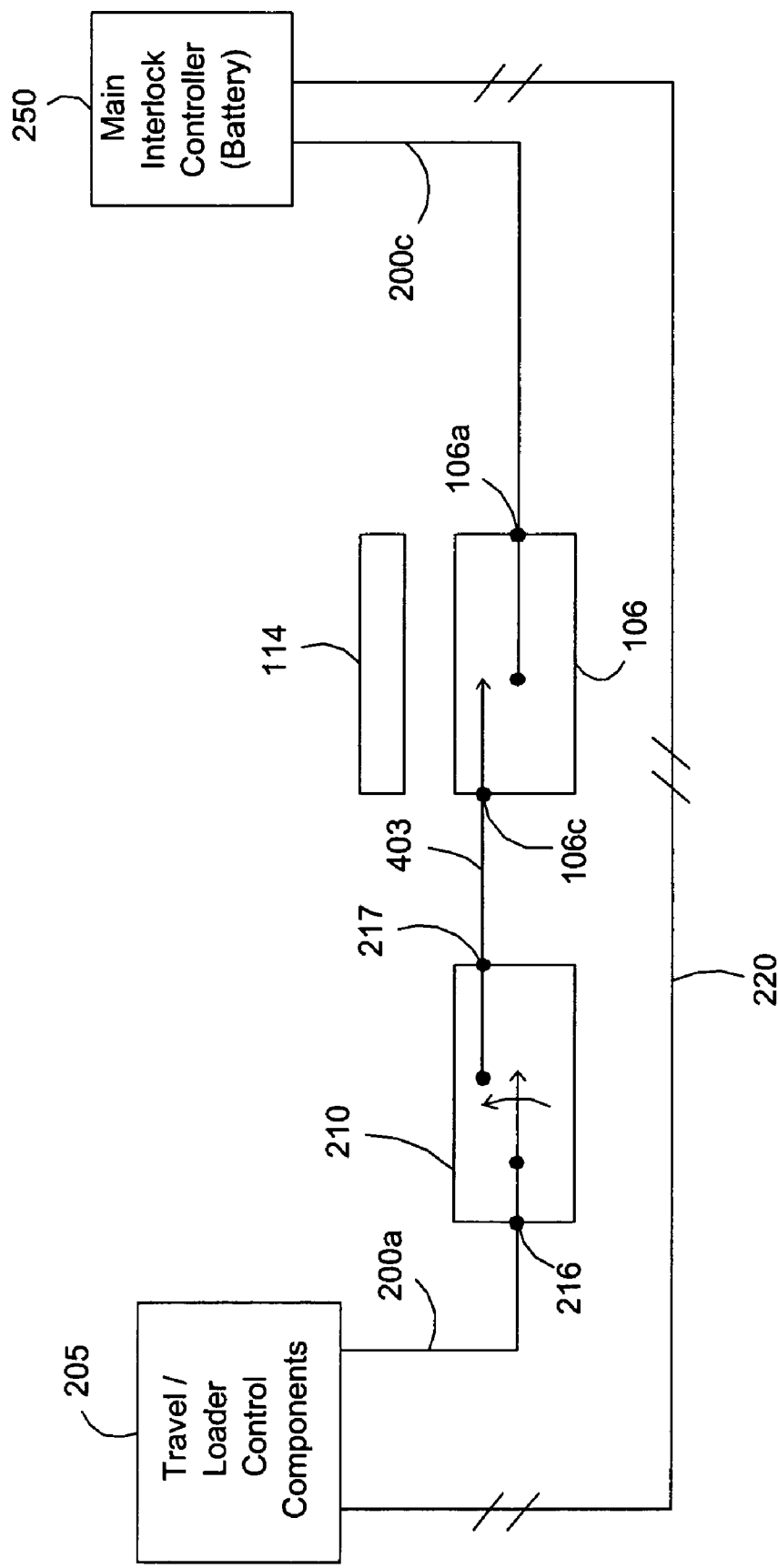
FIG. 4 is a partial schematic wiring illustrating door protection safety circuit in accordance with another aspect of the present invention.

In another aspect of the present invention, the door condition sensing system may be employed without the use of wiring harness 300 or other connectors as desired as depicted in the wiring diagram of FIG. 4. In FIG. 4 safety switch 210 is wired in series with magnetically operated door sensing switch 106 in combination with magnet 114 as previously described. The group of conductors 220 is illustrated as being directly coupled between control block 205 and main interlock controller 250. As illustrated in FIG. 4, conductor 200a is connected to terminal 216 of switch 210. Output terminal 217, electrically connected to the normally open contact of switch 210, is electrically connected to terminal 106c electrically connected to the pole of switch 106 through electrical conductor 403. In turn, the output terminal 106a, electrically connected to the normally open contact of switch 106, is electrically connected to main controller 250 through electrical conductor 200c, as before. Of course mating connector plugs and harness may be located anywhere and in any manner along the electrical conductors as desired as should be recognized by those skilled in the art. Safety switch 210 and door protection switch 106 are intended to function in the same manner as previously described.

Of course, although door sensing switch system has been illustrated by way of a magnetically operated switch assembly, other means are of course possible including mechanically operated trip switches, optical switches, and the like.

Figure 5A:
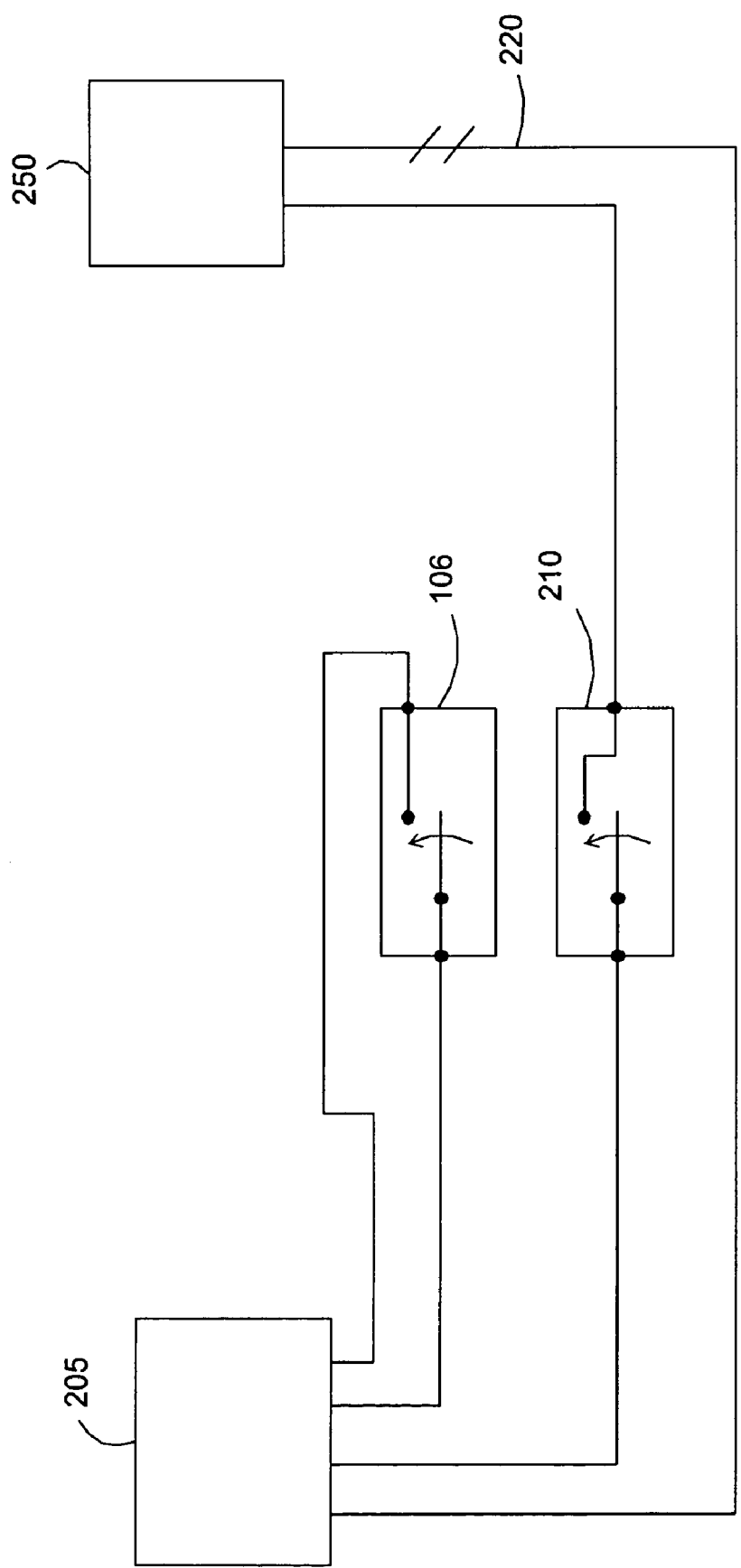
FIGS. 5a and 5b are schematic diagrams illustrating alternate arrangements of the door safety protection system proving control signals to component controls or main interlock control systems.
Figure 5B:
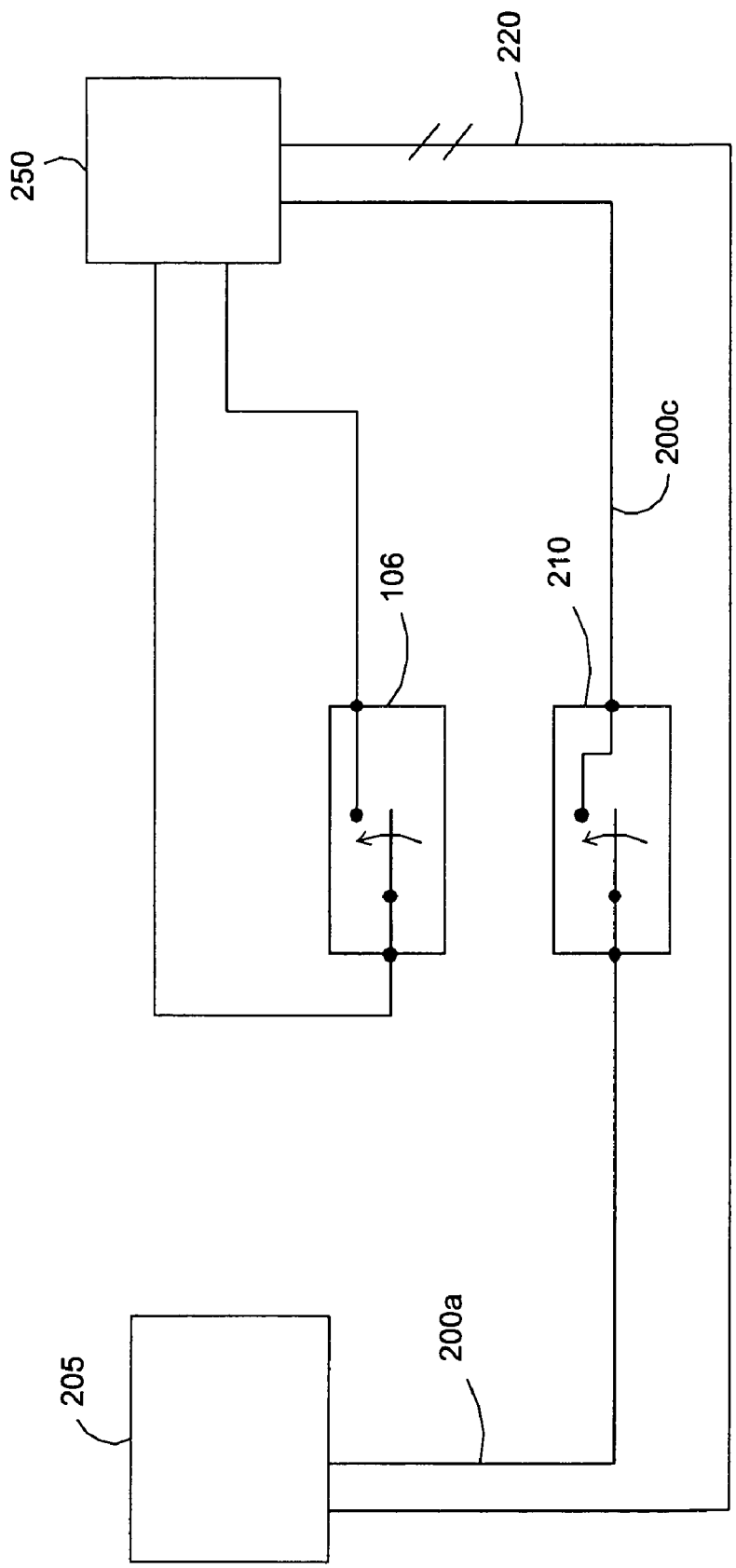

Illustrated in FIGS. 5a and 5b are yet other circuit arrangement in accordance with the present invention for disabling the loader controllers, i.e., lift arms, tilting, and/or travel associated with both the travel/loader control components, block 205, and the main safety main interlock controller 250. As illustrated, the magnetically operated switch 106 or other means may be alternatively electrically connected directly to block 205—FIG. 5a, or connected directly to block 250, so as to be independent of the operator safety switch 210. In other words, switch need not be electrically connected in series with operator safety switch 210 in order to disable the loader control functions independently of the operator safety switch. It should be recognized by those skilled in the art that there are a wide array of electrical circuit arrangements of course possible, e.g., switches closed or open in a safe condition, all of which are intended to be within the true spirit and scope of the present invention.

While the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention as defined by the appended claims.

More specifically, the protection door sensing means has been illustrated by way of the combination of magnetically operated switch 106 and magnet 114. Substitution of other switches, including mechanical operated switches, optical switches, and the like which provide circuit breaking action when the door is opened, is of course possible, all of which are intended to be within the true spirit and scope of the present invention.

Although the present invention has been illustrated by way of wiring diagrams illustrated ion FIGS. 2–5, many such variations are of course possible. In accordance with the present invention, it is the intended function to disable any movement of the loader lift arms upon any occurrence of the access door being opened to prevent both mechanical and human damage or injury as should be recognized by those skilled in the art. In the Figures, main controller 250 and control components block 205 may take on the form of many types of controllers and control functions as dictated by the various skid-steer manufacturers. For example, main controller 250 is referred to by Bobcat as the interlock controller, and control components block 205 is adapted to control both skid-steer travel, i.e., parking brake function that may or may not require restating upon breaking the operator safety switch and/or door protection switch system. These and other variations are all intended to be within the true spirit and scope of the present invention.

Although single pole single throw switches have been illustrated herein, other types of switches, for example single pole double throw switches and corresponding electrical conductors coupled thereto are of course possible depending upon the particular control function desired and the arrangement of blocks 205 and interlock control 250, all of which are intended to be within the true spirit and scope of the present invention.

Lastly, in accordance with the present inventions, the combination of (i) a wiring harness having appropriate end connector plugs, and (ii) an appropriate door protection sensing switch appropriately wired makes the present invention field installable (away from the manufacturing facility) in existing machines. Further, although connector plugs are commonly found in many systems, such systems may alternatively be wired using more or less connector plugs as desired as particularly illustrated in FIG. 4.

I claim:

1. A field adaptable safety protection system for a skid-steer machine including a loader having a pair of hydraulically operable lifting arms capable of raising and lowering an implement, and wherein the skid-steer machine includes an access door for entering a cabin, and includes a machine wiring harness having first and second mating connector plugs for electrically connecting a first group of electrical conductors from one electrical controller at one location to electro-mechanical loader control at another location, the field adaptable safety protection system comprising:
- a field mountable door sensing switch means having at least first and second terminals electrically connected to a pair of contacts, said field mountable door sensing switch means being arranged such that said pair of contacts may be in a first state with said door being in an open condition, and are in a second state with said door being in a closed condition;
- a field added wiring harness having a group of electrical conductors said field added wiring harness terminated at each end thereof with first and second connector plugs, respectively, adapted to respectively mate with said first and second mating connector plugs of said machine wiring harness, said a field added wiring harness capable of,
  - (i) correspondingly connecting a selected group of said first group of electrical conductors from said one electrical controller to said electro-mechanical loader control through said field added wiring harness,
  - (ii) connecting at least a selected one electrical conductor from said first group of conductors coupled through said first mating connector plug through said first connector plug of said field added wiring harness connector plug to a first electrical conductor having a terminating end adapted to be electrically connected to said first terminal of said field mountable door sensing switch means, and
  - (iii) connecting a second electrical conductor having a terminating end adapted to be electrically connected to said second terminal of said field mountable door sensing switch means to at least a selected one electrical conductor of said first group of conductors coupled to said second mating connector plug of said machine wiring harness through said second connector plug of said field added wiring harness,
- where said field mountable door sensing switch means is operable to disable operation of the skid-steer machine loader lifting arm control functions with said access door being in an open condition.

2. A method of operating a skid-steer machine having a loader including a pair of lifting operable arms capable of raising and lowering an implement, and wherein the skid-steer machine includes an access door for entering a cabin, and wherein a group of electrical conductors electrically connect a first electrical controller at one location to an electro-mechanical loader control at another location, the method comprising the steps of:
- sensing the condition of said access door by way of a door sensing switch means having first and second terminals electrically connected to a pair of contacts, where said field mountable door sensing switch means is arranged such that said pair of contacts are open with said door being in an open condition, and are closed with said door being in a closed condition; and
- electrically connecting at least at least one of said electrical conductors through said pair of contacts of said door sensing switch means, such that said field mountable door sensing switch means is operable to disable operation of said skid-steer loader lifting arms with said access door being in an open condition.

3. A method of operating a skid-steer machine having a loader including a pair of lifting operable arms capable of raising and lowering an implement, and an electro-mechanical loader control, and wherein the skid-steer machine includes an access door for entering a cabin, the method comprising the steps of:
- providing a door condition sensing means, where said door condition sensing means is in a first condition with said door being in an open condition, and is in a second condition with said door being in a closed condition;
- detecting the condition of said door condition sensing means; and selectively providing the presence or absence of an electrical signal to said electro-mechanical loader control so as to disable operation of said skid-steer loader lifting arms with said access door being in an open condition.

4. A skid-steer machine including a cabin mounted to a machine body, the skid-steer machine comprising:
- a loader having at least a pair of hydraulically operable lifting arms capable of raising and lowering an implement;
- an access door for entering a cabin;
- a door condition sensing means, said door sensing means being arranged so as to be in a first state with said door being in an open condition, and in a second state with said door being in a closed condition; and
- detecting means responsive to said state of said door condition sensing means for selectively providing the presence or absence of an electiical to said electro-mechanical loader control for disabling operation of said skid-steer loader lifting arm control functions with said access door being in an open condition.

5. A skid-steer machine comprising:
- a cabin mounted to a skid-steer machine body, where said cabin includes an access door for entering said cabin;
- a loader including a pair of hydraulically operable lifting arms capable of raising and lowering an implement in relation to said skid-steer machine body, wherein said pair of lifting arms are located in relationship to opposing sides of said cabin;
- a cabin door state sensing switch means having at least first and second terminals electrically connected to a pair of contacts, said door state sensing switch means being arranged such that said pair of contacts are in a first state with said door being in an open condition, and are in a second state with said door being in a closed condition; and
- a group of electrical conductors for electrically connecting (i) a first electrical controller at one location to (ii) an electro-mechanical loader control at another location, and where at least one of said electrical conductors is electrically and successively connected a) from said first electrical controller, b) through said pair of contacts of said cabin door state sensing switch means, and c) to said electro-mechanical loader control, where said door state sensing switch means is operable to disable operation of said skid-steer loader lifting arms with said access door being in an open condition.

* * * * *